UNITED STATES PATENT OFFICE.

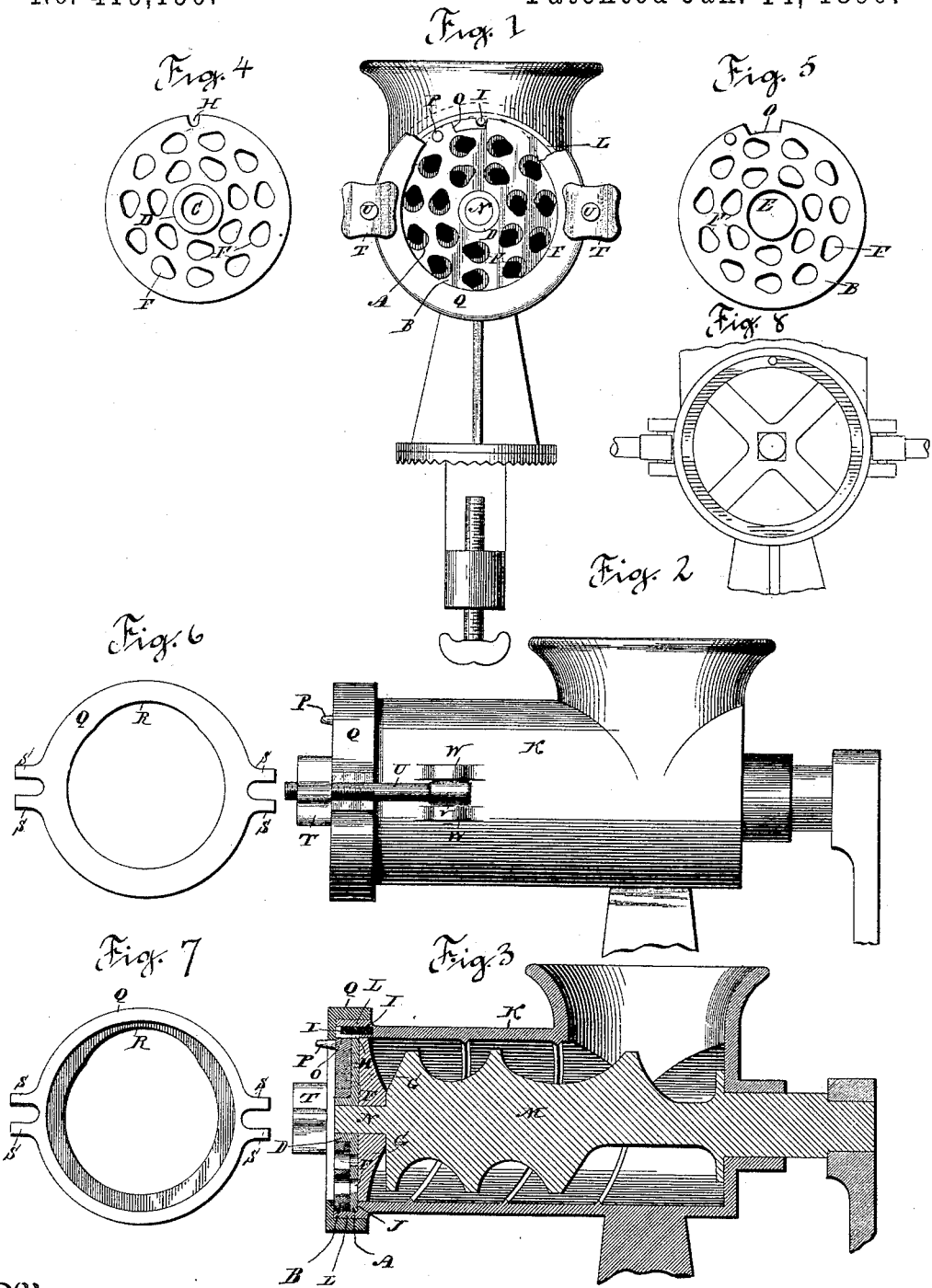

ROBERT C. ELLRICH, OF PLANTSVILLE, CONNECTICUT.

ROTARY MEAT-CUTTER.

SPECIFICATION forming part of Letters Patent No. 419,190, dated January 14, 1890.

Application filed March 15, 1889. Serial No. 303,399. (No model.)

*To all whom it may concern:*

Be it known that I, ROBERT C. ELLRICH, residing at Plantsville, in the county of Hartford and State of Connecticut, have invented certain new and useful Improvements in Rotary Meat-Cutters; and I do declare the following to be a full, clear, and exact description of the same, reference being had to the accompanying drawings, which form a part of this specification.

My invention relates to an improvement in machines for mincing meat, the object being to produce an efficient machine adapted to cut different sizes without change of parts.

With these ends in view my invention consists in two plates located in contact with each other and one being movable upon the other, and having openings arranged and adapted to form variable openings through the plates as the relative positions of the plates are changed, in combination with a cutter working against the inner plate and feeding mechanism for forcing the meat against the said plate, and in certain details of construction, as will be hereinafter described, and pointed out in the claims.

In the accompanying drawings, Figure 1 is a view in front elevation of my improved mincing-machine. Fig. 2 is a view thereof in side elevation. Fig. 3 is a view of the machine in vertical longitudinal section. Fig. 4 is a detached view in elevation of the inner plate. Fig. 5 is a similar view of the outer plate. Fig. 6 is a similar view of the cap. Fig. 7 is a similar reverse view thereof, and Fig. 8 is a broken view in end elevation of the machine with the cap and the plates removed.

The inner plate A and the outer plate B have the same diameter, the former being fixed in the machine and the latter being movable. The inner plate is thinner than the outer plate, for reasons which will be set out hereinafter. The inner plate has a hole C in its center and a socket D upon its outer face. The outer plate has a hole E in its center to adapt it to fit over such socket, upon which it turns. These plates have openings made in them. The form of the openings may vary—as, for example, they may be circular, of different size, and spaced so that only the openings of one size will be in line at any one time, or they may be elongated curved slots whose sides correspond in curvature and whose ends are semicircular, or they may be radial slots cut inward from the edges of the plates. The form of openings which I prefer, however, are shown in Figs. 1, 3, 4, and 5 of the drawings. These openings $f$ are larger at one end than at the other, their smaller ends being adapted to pass the smallest and their larger ends the largest fragments of meat required. Then as one plate is moved the openings through the plates will be varied within the range of the largest and smallest fragments that the meat can be cut up into. As herein shown, the openings are arranged in an inner and an outer circular series. The openings in the outer series of the two plates are equidistant. Those of the inner series are also equidistant, but nearer together. The openings in one plate are reversed in direction from those in the other plate, so that when the outer plate is moved the openings through the plates will be approximately circular. The inner plate should be thinner than the diameter of the holes made for the smaller ends of the openings. The outer plate is made of sufficient thickness to resist the pressure of the meat against it. The plates are made and arranged so that the smaller ends of the openings in the inner plate will extend in the direction in which the knives G of the cutter rotate. The openings may be formed by boring for each opening two intersecting holes, one of which is adapted in diameter to pass the smallest and the other the largest fragment of cut meat. Then the outwardly-projecting jogs between the holes are removed, so as to form slightly-curved walls converging toward the smaller ends of the openings.

The inner plate has a notch H formed in its edge to receive a pin I, which prevents the plate from turning. This pin projects from the shoulder J, upon which the plate rests, and which is formed at the outer end of the cylinder K, which receives the crude meat. The plate fits within a flange L, also formed in the forward end of the cylinder, and centers and supports the feed-screw M, the forward end of the spindle N whereof enters the socket D of the plate. A wide notch O, formed in the edge of the outer plate, receives the pin I aforesaid. The end walls of this slot engage with such pin and limit the turning of the plate, which is moved by a finger P, projecting from its outer edge.

A cap Q, fitting over the outer end of the cylinder, holds the plates in place against the pressure of the meat within the same, tending to push them away from the cutter, which, it may be here remarked, is loosely fitted upon the squared portion of the spindle, so that it may rock and adjust itself to the rear face of the inner plate. The cap is cut away, as at R, to make room for the finger of the outer plate to move in. Two pairs of projections S S, each having a U-shaped space between them and respectively projecting from the opposite edges of the said cap, are engaged by nuts T T, located upon the outer ends of bolts or couplers U U, fitting into the U-shaped spaces and swinging at their inner ends upon rivets V V, mounted in lugs W W, formed upon the sides of the cylinder.

The operation of my improved mincing-machine is as follows: Meat being put into the cylinder, the feed-screw is turned, whereby it is forced forward beyond the cutter and against the two plates, portions of the outer plate being exposed on the inside of the cylinder through the openings in the inner plate. The meat being pressed forward, as described, enters or protrudes into the openings in the plates and is cut off by the cutter, which acts on the inner face of the inner plate. The fragments of meat so cut off at once drop out of the openings in the outer plate without requiring to be pushed out of the machine by the pressure produced within the cylinder. This is because the inner plate is made so thin that it does not hold the fragments after they have been severed from the mass. When anything smaller than the largest-sized fragments are being cut, the openings in the individual plates are larger than the fragments which do not fill the openings in the outer plate and readily drop out of them. The thinner the inner plate is the less will it hold the fragments, so that the best results and the freest feeding of the meat are secured with a very thin inner plate. Then, again, the thinner the inner plate is the more nearly do the openings in the individual plates approximate to single openings when the plates are combined. By loosening the nuts the outer plate may be turned within the limits of the slot in its edge for varying the size of the openings through the plates, and hence the rate of the feed and the fineness of the cut, for when the openings are small the meat feeds slowly and is cut fine, while when the openings are large it feeds rapidly and cuts coarse. By loosening the nuts sufficiently they may be swung away and entirely disengaged from the cap, which may then be taken off for removing the plates to clean them, or for any other purpose. By providing the outer face of the inner plate with a hub and the outer face of the outer plate with a finger and its edge with a slot, the right return of the plates to the cylinder is made unavoidable. The means for coupling the cap with the cylinder may be reversed and the bolts hung between the projections of the cap and arranged to pass between the lugs on the cylinder. The lugs would then be engaged by the nuts.

I am aware that it is not new to force meat into a perforated plate and then cut the protruding meat from the mass by means of a knife acting upon the inner face of the plate, through which the cut meat is then forced by means of the pressure of the meat behind the plate. In such a machine not only is one plate and the cutter solely relied upon to cut the meat, but also the pressure within the cylinder is solely relied upon to discharge the cut meat from the plate on which the knife acts. In my machine, however, I necessarily employ two plates with the cutter. My thin inner plate, through which I secure the free discharging of the cut meat, is not sufficiently heavy to resist the pressure of the meat, but must be supported by the outer plate. My invention is different, therefore, from anything in the prior art, in that it requires two plates for the meat to pass through instead of one, as in the mincing-machines heretofore constructed, and in that the cut meat is discharged from the plate upon which the cutter acts independent of the pressure within the cylinder.

September 2, 1887, I filed an application for a patent for a meat-cutter having two plates, which application was examined and allowed, but nothing further done; but nothing done or omitted to be done in that case is to be looked upon as an abandonment of any invention disclosed in the application.

Having fully described my invention, what I claim, and desire to secure by Letters Patent, is—

1. A mincing-machine having two plates located in contact with each other and one being movable upon the other and both being provided with openings arranged and adapted to form variable openings through the plates as the relative positions of the plates are changed, a cutter working against the inner plate, and feeding mechanism for forcing the meat against the said plate.

2. A mincing-machine having an inner and an outer plate located in contact with each other and provided with openings arranged and adapted to form variable openings through the plates as the relative positions of the plates are changed, and the inner plate being provided with an outwardly-projecting hub, on which the outer plate turns, a cutter working against the inner plate, and feeding mechanism for forcing the meat against the said plate.

3. A mincing-machine having an inner and an outer plate located in contact with each other and provided with openings arranged and adapted to form variable openings through the plates as the relative positions of the plates are changed, the inner plate having its edge notched to receive a pin which holds it in place, and the outer plate having its edge notched to receive such pin, which limits its movement upon the inner plate, a cutter working against the inner plate, and feeding mechanism for forcing the meat against the said plate.

4. A mincing-machine having a cylinder, an inner and an outer plate located in contact with each other in the outer end thereof, a cap fitting over such end of the cylinder and holding the plates in place, and provided at opposite points on its edge with a pair of projections, couplers carrying nuts for holding the cap on the cylinder, a cutter working against the inner plate, and feeding mechanism for forcing the meat against the said plate, the plates being provided with openings arranged and adapted to form variable openings through the plates as the relative positions of the plates are changed.

In testimony whereof I have signed this specification in the presence of two subscribing witnesses.

ROBERT C. ELLRICH.

Witnesses:
 CHAS. B. SHUMWAY,
 WM. J. DE MAURIAC.